United States Patent [19]

Stolle et al.

[11] Patent Number: 5,287,176
[45] Date of Patent: Feb. 15, 1994

[54] AUTOMATIC CONTRAST AND BRIGHTNESS CONTROL FOR THERMAL IMAGE APPARATUS INTEGRATED INTO AN AIRCRAFT

[75] Inventors: Edwin Stolle, Oberkochen; Jügen Nolting, Aalen-Wasseralfingen; Günter Eck, Aalen, all of Fed. Rep. of Germany

[73] Assignee: Carl-Zeiss-Stiftung, Heidenheim, Fed. Rep. of Germany

[21] Appl. No.: 39,897

[22] Filed: Mar. 30, 1993

[30] Foreign Application Priority Data

Apr. 3, 1992 [DE] Fed. Rep. of Germany ....... 4211133

[51] Int. Cl.$^5$ ...................... H04N 5/33; H04N 5/235; H04N 5/57
[52] U.S. Cl. .................................. 378/98.7; 348/678; 348/687
[58] Field of Search .............. 358/168, 169, 113, 183; 250/330; H04N 5/33, 5/235, 5/57

[56] References Cited

U.S. PATENT DOCUMENTS

| | | | |
|---|---|---|---|
| 3,953,667 | 4/1976 | Layton et al. | 358/113 |
| 4,618,892 | 10/1986 | Kawaguchi | 358/163 X |
| 5,083,204 | 1/1992 | Heard et al. | 358/113 |
| 5,091,779 | 2/1992 | Ams et al. | 358/98 X |
| 5,225,903 | 7/1993 | Wittrin | 358/113 |

*Primary Examiner*—Mark R. Powell
*Assistant Examiner*—John W. Miller

[57] ABSTRACT

A process for the automatic contrast and brightness control for thermal imaging apparatus of FLIR systems which is used for forming the actual value of the contrast and brightness of an evaluation window, fixing the shape of the evaluation window and displacing the position of the evaluation window in dependence on the content of the FLIR image, includes: utilizing "n" vertical image columns for evaluation of the FLIR image, converting the average brightness of the FLIR image into an analog voltage signal, comparing the analog voltage signal with a video signal of the FLIR image, summing the results of the comparison in the vertical image columns of the FLIR image such that a sum value results for each image column, determining the position of the horizon from the amounts of the sum values, and in the case of column sums that differ from each other, determining the optimum position of the evaluation window in the horizontal direction from the sum values of the columns such that the surface center of gravity of the evaluation window lies on the column with the maximum column sum, and determining the optimum position of the evaluation window in the vertical direction from this column sum such that the uppermost boundary of the evaluation window in this column does not exceed the determined height of the horizon.

6 Claims, 3 Drawing Sheets

AUTOMATIC CONTRAST AND BRIGHTNESS CONTROL FOR THERMAL IMAGE APPARATUS INTEGRATED INTO AN AIRCRAFT

FIELD OF THE INVENTION

The invention relates to a process and a system for automatic contrast and brightness control for thermal image apparatus of an integrated forward-looking-infrared (FLIR) system in an aircraft that utilizes a window of the FLIR image for forming the actual values of contrast and brightness.

BACKGROUND OF THE INVENTION

FLIR systems are integrated into aircraft weapon systems for target location and target abatement. These systems are intended to increase the operational efficiency of the aircraft and lighten the burden on the pilot. A thermal image apparatus is an essential component of the FLIR system and generates a visible image on a TV-monitor (FLIR image) corresponding to the infrared radiation of the scene under observation. Hot targets with intense infrared radiation are thereby displayed as white while cold targets having lower infrared radiation are displayed as black.

The FLIR system is equipped with an automatic contrast and brightness control system for lessening the burden on the pilot. This system is intended to display scenes of special importance for the pilot that are below the horizon line so that they are displayed rich in contrast and with average brightness. This is achieved conventionally in that for the actual value formation of the contrast and brightness control, not the entire FLIR image is utilized; instead, only a horizontal strip-shaped segment (hereinafter referred to as evaluation window) is utilized. The upper boundary of the contrast and brightness window extends in the vicinity of the horizon line as it is visible in the normal flying position. On the other hand, the lower boundary lies at a distance away from the lower image edge such that the scenes that change rapidly because of the flying speed are not considered for the contrast and brightness control.

Disadvantages of conventional FLIR systems occur with intense roll movements of the aircraft wherein larger surfaces of the sky and smaller surfaces of the earth are imaged on the monitor than during normal flight. With the appearance of large black areas on the monitor, the automatic contrast and brightness control of the system becomes operational and reacts in that the contrast of the thermal image is attenuated and its brightness is increased which, in this case, provides a weak image having low contrast for the pilot.

SUMMARY OF THE INVENTION

It is an object of the invention to provide a process and a system for determining the optimum position of the evaluation window in both vertical and horizontal directions from the content of the FLIR image.

The process for the automatic contrast and brightness control for thermal imaging apparatus of FLIR systems according to the invention, which is used for forming the actual value of the contrast and brightness of the evaluation window, fixing the shape of the evaluation window and displacing the position of the evaluation window in dependence on the content of the FLIR image, includes:

utilizing "n" vertical image columns for evaluation of the FLIR image, converting the average brightness of the FLIR image into an analog voltage signal, comparing the analog voltage signal with a video signal of the FLIR image, summing the results of the comparison in the vertical image columns of the FLIR image such that a sum value results for each image column, determining the position of the horizon from the amounts of the sum values, and in the case of column sums that differ from each other, determining the optimum position of the evaluation window in the horizontal direction from the sum values of the columns such that the surface center of gravity of the evaluation window lies on the column with the maximum column sum, and determining the optimum position of the evaluation window in the vertical direction from this column sum such that the uppermost boundary of the evaluation window in this column does not exceed the determined height of the horizon.

In the case of the simultaneous appearance of the maximum column sum in several adjacent columns, the optimum position of the evaluation window in the horizontal direction is determined such that the surface center of gravity lies on a column that is adjacent to a column with a smaller column sum.

In the case of equality of all column sums, the optimum position of the evaluation window in the horizontal direction is determined such that the surface center of gravity of the evaluation window lies on the middle column.

A control system according to the invention for carrying out the process according to the invention includes an oscillating mirror with a control circuit, an infrared detector line for converting infrared signals from the oscillating mirror into electrical signals, an array of light emitting diodes controlled by an amplifier chain for converting electrical signals from the infrared detector line into visible light, imaging optics for producing a visible image of the visible light in a CCD camera, and a CCD camera for transforming the visible image into video signals. The arrangement also includes a monitor connected to the CCD camera, an evaluation window for the FLIR image, and an actual value processor and a switch for the area of the evaluation window. A threshold generator for receiving the video signals from the CCD camera, a comparator and a column evaluation circuit are provided for determining the optimum position of the evaluation window and for its generation.

The form of the window corresponds to an isosceles triangle. The form of the window as having a triangular form is described here only as being exemplary. This window could also have other forms, adapted to the scenes of which the aircraft flies and flight conditions. The important advantage to using the invention is the displaceability of the window in the FLIR image, which is undertaken in correspondence to the image content determined by the contrast and brightness control system.

With the suitably selected and pregiven form of the evaluation window for the contrast and brightness control and by means of its automatically controlled displacement, the condition is prevented that the cold sky enters the evaluation window during roll movements up to approximately 90 and unfavorably influences the contrast and brightness control. The advantages obtained by the invention therefore include that the brightness in the thermal image is not made brighter and the contrast is not attenuated during roll movements of the aircraft of up to nearly 90. This results in a significant improvement with respect to the detectability of details of a scene during roll movements.

BRIEF DESCRIPTION OF THE DRAWINGS

The invention will now be described with reference to the drawings, wherein.

DESCRIPTION OF THE PREFERRED EMBODIMENT

Figure 3:
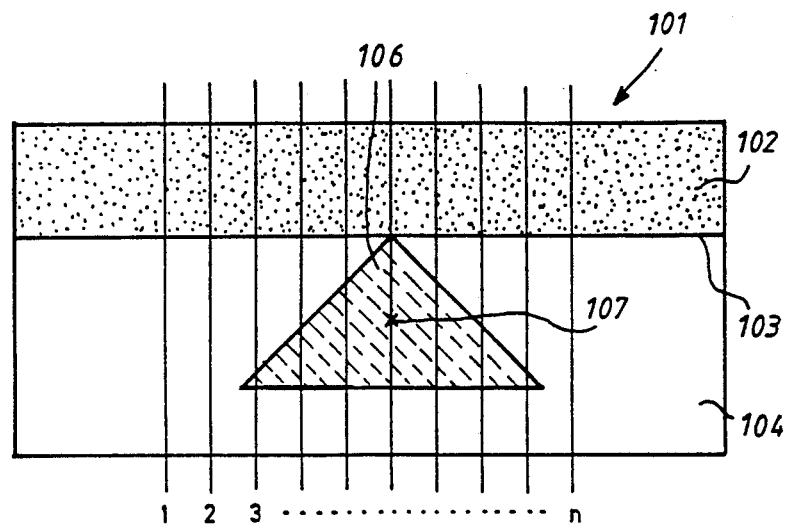
Figure 4:
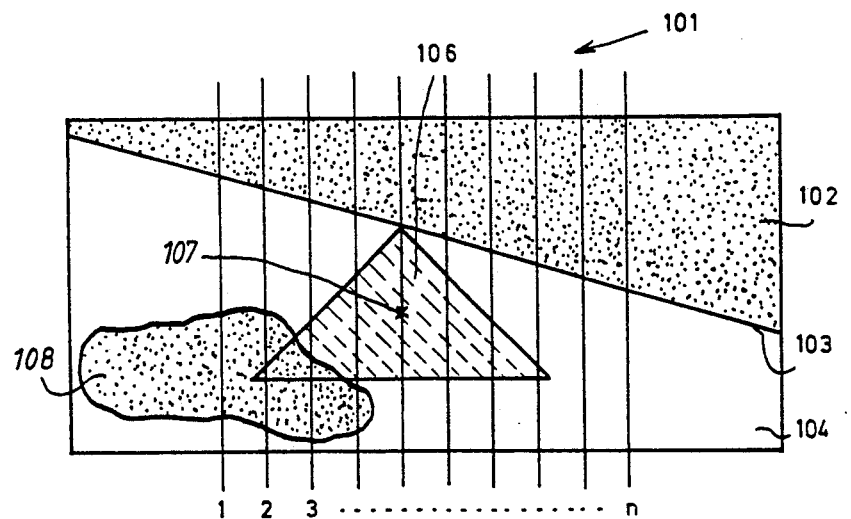
Figure 5:
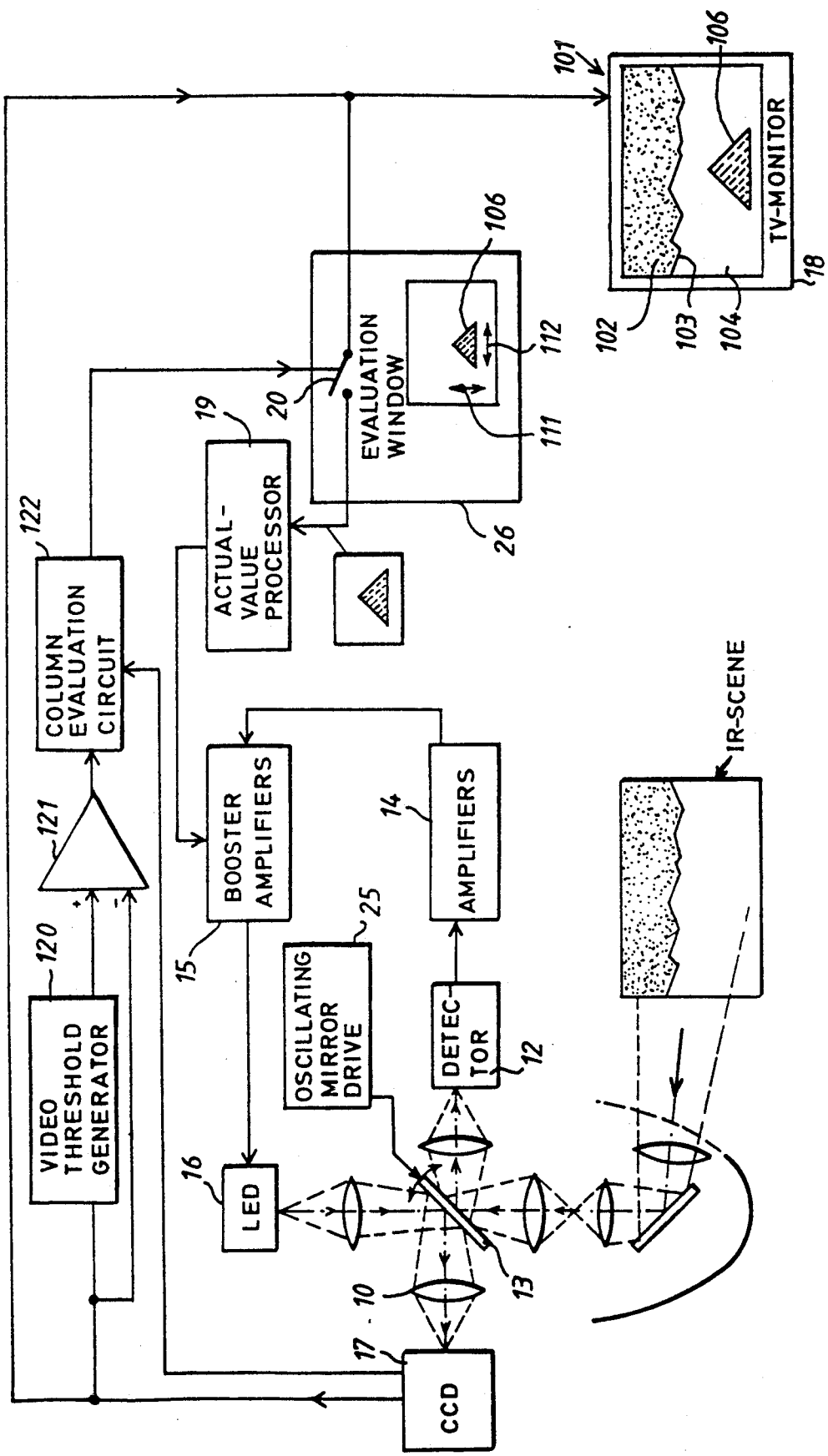
FIG. 5 shows a block circuit diagram for a control system according to the invention for carrying out the process according to the invention.

The FLIR image is denoted by reference number (101) in FIGS. 1-4 and on the display screen of a TV monitor in FIG. 5. It consists of a scene taken by a FLIR system. Vertical columns are added into the FLIR image (101), and are numbered from 1 through n. The sky, which represents a cold target for the FLIR system, is symbolically shown in black by black spots, and is denoted by reference symbol (102). The ground, as a hot target, is shown white and is denoted by reference symbol (104). The line of the horizon (103) divides the sky and ground in the representation of the thermal image. According to the process according to the invention, the evaluation window is optimally positioned when it covers a portion of the landscape as near the horizon as possible, but not a portion of the sky. In the representation shown in FIG. 1, the surface center of gravity (107) of the segment or evaluation window (106) is situated in column 1. In this column, the proportion of the hot scene is the greatest in comparison with the other columns. Thus, the horizon (103) is situated highest in advance of the region of the FLIR image included in image column 1.

Figure 1:
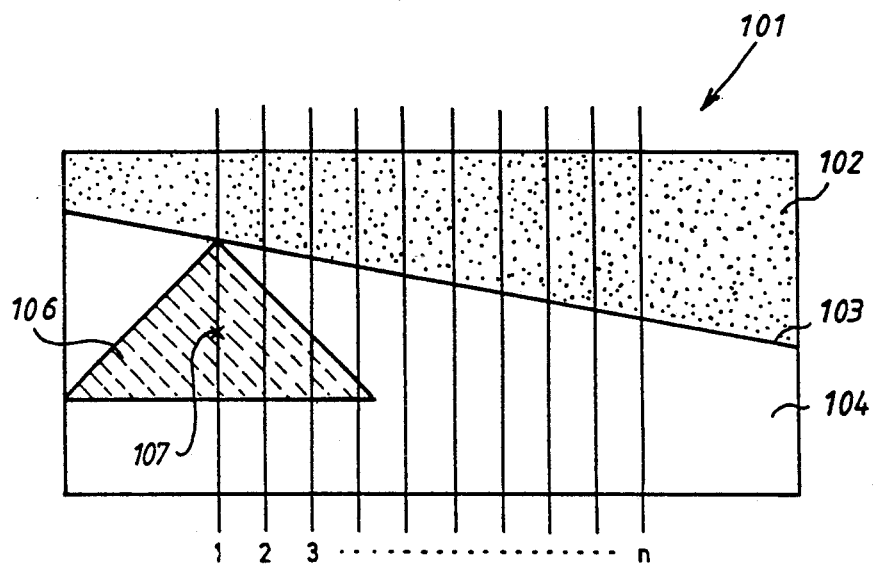
FIGS. 1-4 show representations of a FLIR image with a sky, a horizon and landscape shown schematically, and a series of image columns and an evaluation window.
Figure 2:
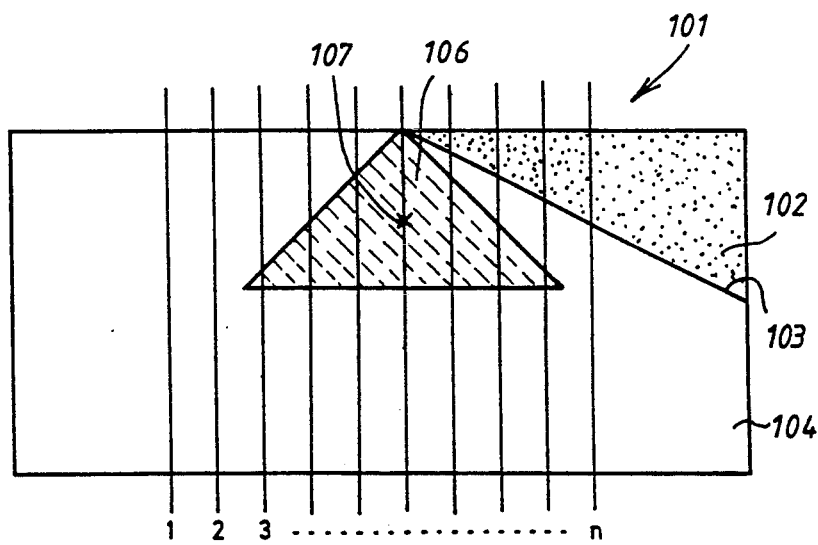

In the representation shown in FIG. 2, the columns 1-6 have the same maximum proportion of hot scenes because the sky does not appear in these columns. The surface center of gravity (107) of the evaluation window (106) is positioned on image column 6, which is adjacent to a column that contains a smaller proportion of the hot scene.

In the representation shown in FIG. 3 the proportion of hot scenes are equal for all columns. In this case, the evaluation window (106) is positioned such that its surface center of gravity is situated on one of the middle columns.

The representation shown in FIG. 4 demonstrates that the process and system according to the invention function even with cold scene influences, e.g., a cold sea (108). The cold sea is shown in black in the FLIR image.

The block diagram of FIG. 5 shows a preferred embodiment for carrying out the process according to the invention. The scanning process, known per se, used in the FLIR system is a parallel scan process. It is characterized by a line of infrared detector elements (12), e.g., 180 individual elements arranged in a column that scan the infrared scene by means of an oscillating mirror (13) and convert the infrared signals of this scene into electrical signals. An amplifier chain consisting of the amplifier (14) and booster amplifier (15), controls an array of light emitting diodes (LED) (16). The visible light from the LED is deflected on the rear side of the oscillating mirror (13). In this manner, with the aid of imaging optics (10), a visible image in phase with the scanning process is produced on the detector array of a CCD camera (17). The CCD camera (17) transforms the visible image into a series video signal corresponding to the CCIR television standard. The video signal is made visible to the user by a monitor (18).

The contrast and brightness adjustment takes place by means of amplification changes and offset shifts in booster amplifier (15). The control for contrast and brightness takes place, starting from the TV video signal of the CCD camera (17), via the evaluation window (106), to the actual value processor (19), for input to the booster amplifier (15). In the actual value processor (19), the TV signals are converted into DC voltage signals. The switch (20) is only closed in the area of the evaluation window (106).

The vertical and horizontal displacement of the evaluation window (106) in the vertical and horizontal directions (111, 112), takes place by means of the column evaluation circuit (122). The average image brightness is determined by means of a video threshold generator (120). The video signal is compared in a comparator (121) with the output voltage of the video threshold generator (120). All portions of the scene whose image brightness exceeds a given fraction of the average brightness provide a maximum voltage at the output of the comparator (121), and all other portions of the scene provide a minimum voltage. The output voltage of the comparator is summed separately in the column evaluation circuit (122) for the respective columns 1 through n.

The n sum values obtained in this manner are a direct measure of the proportion of hot scenes in the n columns. A large sum value of a column corresponds to a high proportion of hot scenes in this column. In dependence on the sum values, the column evaluation (122) controls the switch (20) so that only video signals that lie within the evaluation window arrive at the actual value processor (19). Thus onlyimage portions within the evaluation window are used for contrast and brightness control.

The evaluation window (106) does not appear on the monitor (18) in the normal case. In the representation of FIG. 5, it is shown for the purpose of illustration.

We claim:

1. Process for the automatic contrast and brightness control for thermal imaging apparatus of a forward-looking infrared (FLIR) system integrated into an aircraft, which is used for the formation of the actual value of the contrast and the brightness of an evaluation window of the FLIR image, fixes the shape of said evaluation window for a control system and determines the position of said evaluation window in said FLIR image in dependence on the content of said FLIR image, comprising:

utilizing "n" vertical image columns for evaluation of said FLIR image, converting the average brightness of said FLIR image into an analog voltage signal, comparing said analog voltage signal with a video signal of said FLIR image, summing the results of the comparison in the vertical image columns of said FLIR image such that a sum value results for each image column, determining the position of the horizon from the amounts of the sum values, and in the case of column sums that differ from each other, determining the optimum position of said evaluation window in the horizontal direction from the sum values of the columns such that the surface center of gravity of said rating window lies on the column with the maximum column sum, and determining the optimum position of said evaluation window in the vertical direction from this column sum such that the uppermost boundary of said evaluation window in this column does not exceed the determined height of the horizon.

2. Arrangement for carrying out the process according to claim 1, comprising:

an oscillating mirror with a control circuit, an infrared detector line for converting infrared signals with the aid of said oscillating mirror into electrical signals, an array of light emitting diodes controlled by an amplifier chain for converting electrical signals from said infrared detector line into visible light, imaging optics for producing a visible image of said visible light in a CCD camera, a CCD camera for transforming said visible image into video signals, a monitor connected to said CCD camera, a evaluation window for the FLIR image, an actual value processor and a switch for the area of the evaluation window; and a threshold generator for receiving said video signals from said CCD camera, a comparator and a column evalution circuit for determining the optimum position of said evaluation window and for its generation.

3. Process for the automatic contrast and brightness control for thermal imaging equipment of forward-looking infrared (FLIR) systems integrated into aircraft, which is used for the formation of the actual value of the contrast and the brightness of a evaluation window of the FLIR image, presets the shape of said evaluation window for a control system and determines the position of said evaluation window in said FLIR image in dependence on the content of said FLIR image, comprising:

utilizing "n" vertical image columns for the evaluation from said FLIR image, converting the average brightness of said FLIR image into an analog voltage signal, comparing said analog voltage signal with the video signal of said FLIR image, summing the results of the comparison in the vertical image columns of said FLIR image such that a sum value results for each image column, determining the position of the horizon from the amounts of the sum values, and, in the case of the simultaneous appearance of the maximum column sum in several adjacent columns, determining the optimum position of said evaluation window in the horizontal direction such that the surface center of gravity of said evaluation window lies on the column which is adjacent to a column with a smaller column sum, and determining the optimum position of said evaluation window in the vertical direction from this column sum such that the uppermost boundary of said evaluation window in this column does not exceed the determined height of the horizon.

4. Arrangement for carrying out the process according to claim 3, comprising:

an oscillating mirror with a control circuit, an infrared detector line for converting infrared signals with the aid of said oscillating mirror into electrical signals, an array of light emitting diodes controlled by an amplifier chain for converting electrical signals from said infrared detector line into visible light, imaging optics for producing a visible image of said visible light in a CCD camera, a CCD camera for transforming said visible image into video signals, a monitor connected to said CCD camera, a evaluation window for the FLIR image, an actual value processor and a switch for the area of the evaluation window; and a threshold generator for receiving said video signals from said CCD camera, a comparator and a column evalution circuit for the determining the optimum position of said evaluation window and for its generation.

5. Process for the automatic contrast and brightness control for thermal imaging equipment of forward-looking infrared (FLIR) systems integrated into aircraft, which is used for the formation of the actual value of the contrast and brightness of a evaluation window of the FLIR image, presets the shape of said evaluation window for a control system and determines the position of said evaluation window in said FLIR image in dependence on the content of said FLIR image, comprising:

utilizing "n" vertical image columns for the evaluation from said FLIR image, converting the average brightness of said FLIR image into an analog voltage signal, comparing said analog voltage signal with the video signal of said FLIR image, summing the results of the comparison in the vertical image columns of said FLIR image such that a sum value results for each image column, determining the position of the horizon from the amounts of the sum values, and in the case of the equality of all column sums, determining the optimum position of said evaluation window in the horizontal direction such that the surface center of gravity of said evaluation window lies on the middle column, and determining the optimum position of said evaluation window in the vertical direction from these column sums such that the uppermost boundary of said evaluation window in this column does not exceed the determined height of the horizon.

6. Arrangement for carrying out the process according to claim 5, comprising:

an oscillating mirror with a control circuit, an infrared detector line for converting infrared signals with the aid of said oscillating mirror into electrical signals, an array of light emitting diodes controlled by an amplifier chain for converting electrical signals from said infrared detector line into visible light, imaging optics for producing a visible image of said visible light in a CCD camera, a CCD camera for transforming said visible image into video signals, a monitor connected to said CCD camera, a evaluation window for the FLIR image, an actual value processor and a switch for the region of the evaluation window; and a threshold generator for receiving said video signals from said CCD camera, a comparator and a column evalution circuit for the determination of the optimum position of said evaluation window and for its generation.

* * * * *